(No Model.)
E. FOX.
DIGESTING, EVAPORATING AND REFRIGERATING APPARATUS.
No. 243,769.   Patented July 5, 1881.
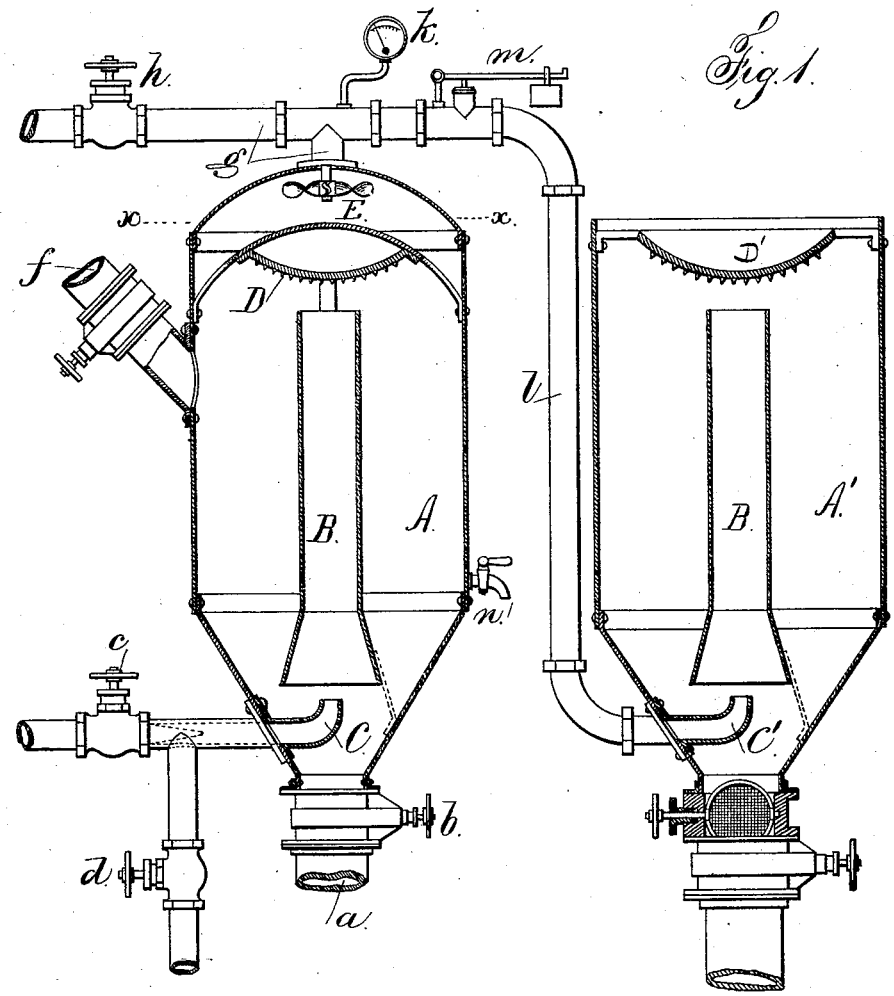
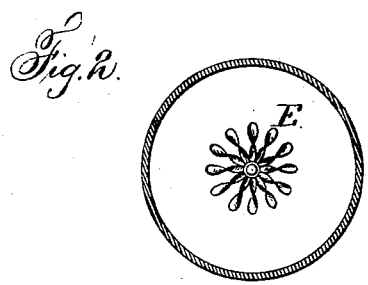
Witnesses
Harold Serrell
Chas. H. Smith
Inventor
Edward Fox
per Lemuel W. Serrell
att

United States Patent Office.

EDWARD FOX, OF BROOKLYN, NEW YORK, ASSIGNOR TO HIMSELF, JOSEPH SHELLY, OF NEW YORK, N. Y., MRS. M. H. DANIELS, OF MONT CLAIR, NEW JERSEY, AND W. S. HAVILAND, OF BROOKLYN, NEW YORK.

DIGESTING, EVAPORATING, AND REFRIGERATING APPARATUS.

SPECIFICATION forming part of Letters Patent No. 243,769, dated July 5, 1881.

Application filed February 23, 1881. (No model.)

*To all whom it may concern:*

Be it known that I, EDWARD FOX, of Brooklyn, in the county of Kings and State of New York, have invented an Improvement in Digesting, Evaporating, and Refrigerating Apparatus, of which the following is a specification.

In Letters Patent No. 216,841, granted to me, an apparatus is set forth for digesting, in which the material is caused to circulate by the action of a jet of steam. I have made improvements in the aforesaid apparatus, and discovered that novel operations or processes can be performed in the said apparatus.

I will first describe the apparatus and then set forth some of the various uses to which it may be applied.

In the drawings, Figure 1 is a vertical section of the apparatus, and Fig. 2 is an inverted plan at the line $x$ $x$.

The vessel A is of a suitable size, according to the operations to be performed in it. The bottom is conical, leading to the discharge-pipe $a$, in which is a valve or cock, $b$. The top of the vessel A is preferably convex. Within the said vessel A there is a vertical tube, B, open at both ends, and the bottom is preferably flaring. The deflector D is supported above the end of the tube B, and the edge or under side of this deflector is serrated to form numerous points or teeth, from which the vapors condensing upon the plate D will drop, and these points also act as teeth to tear any material that may be thrown into contact with them.

At the bottom of the vessel A is a jet-nozzle, C, connected with pipes to the cocks $c$ $d$, from which pipes lead to a steam-boiler and to an air-compressor, so that by means of the cocks $c$ and $d$ either air or steam, or a mixture of the two, can be admitted at the required pressure and speed to cause a rapid circulation of the contents of the vessel up the tube B, against the deflector D, and down again in the vessel A outside the tube B. By this means the grain or other material in the vessel A will be rapidly digested in the presence of a liquid substance.

There is an inlet pipe or hopper, $f$, with a cock or gate, to allow the material that is to be acted upon to pass into the apparatus; and at the top of the vessel A there is a pipe, $g$, having a cock, $h$, through which water may be supplied, and a pressure-indicator, $k$. The pipe $l$ passes to a second digester similar to the first, only the top is open.

There should be a safety-valve, $m$, to prevent injury to the apparatus.

The operation of the air or steam, or both, passing through the pipe $l$ and discharging through the jet-orifice C', is the same as in the apparatus A to produce a rapid circulation of the materials placed in the vessel A', and by the heat and attrition to digest or disintegrate and dissolve the materials introduced with the water into such vessel.

The try-cock at $n$ enables the attendant to ascertain when the charge has reached the desired point in its treatment, and I employ the centrifugal fan E, placed below or in the entrance to the pipe $g$, which is revolved by the current of air or steam as it passes, and the blades receive upon them any liquid particles that otherwise might pass away, and the centrifugal action throws off said liquid within the vessel A.

When using the apparatus as an evaporator or for refrigerating or cooling purposes the pipe $l$ may pass to a condensing worm or coil if it is desired to condense the escaping vapors. The water, when it is supplied into the apparatus by the pipe $g$, is scattered in a spray from the fan E, which is revolved by the water, and this water aids in cooling the contents of the vessel A and lessening the temperature of the escaping air, which air may act in the vessel A' or other device to be cooled.

It is well known that air under a heavy pressure absorbs heat when the same is allowed to expand; hence the liquid or semi-liquid contents can be cooled by compressed air introduced in place of heated air, and hence this apparatus, when so used, becomes a refrigerator or cooler.

In the manufacture of beer the brewer seeks to produce a partially fermented and gradually-fermenting liquid from barley, hops, water, and yeast.

It is well known that by substituting and converting the starch of other grain, &c., for the starch contained in malt, beer can be made cheaper and without as much risk of injury to its flavor or quality. Brewers take advantage of this fact by using the glucose which is produced by the action of sulphuric acid on starch. These substitutes are of little value, because these articles contain little or no dextrine, which is valuable for giving body and flavor to the beer and preventing deterioration. Beer made by adding glucose is thin and watery and lacking in body or flavor, and is liable to sour and spoil.

With my apparatus a mash or wort can be made from the starch of other grains combined with the proper proportion of malt. In this case the diastase contained in the malt acts upon the starch of the grain. This transforming process is stopped at the desired point of the operation and an extract of mash is obtained having the proper quantity of maltose and dextrine for brewers' use.

With my apparatus no grinding of the grain is required, and I am able to make the cheaper grain suitable for brewing purposes. The brewer can with this apparatus make his own extract and run it into the coppers together with the proper proportion of malt-wort. To prepare this extract the corn in an unground condition is fed into the vessel A, which is filled with water. Steam is turned on, and by the water and agitation the corn is dissolved rapidly into a wort, the starch of which is more thoroughly treated than can be done by mill-grinding. The wort can be then cooled to the right temperature without removing it out of the apparatus by means of a jet of air. The brewer can then add his ground malt in whatever proportion suits his purpose. The conversion of the starch of the corn, as well as of the malt, then takes place, and the extract of malt or maltose dextrine is made.

As stated, the operation is carried on in the one apparatus and the jet of steam effects the disintegrating, heating, and agitating of the substances to be treated. It is also preferable to use air for cooling purposes, as the cold produced by the expanding air aids in the formation of sugar from the starch of the material treated.

In some operations I prefer to use air compressed and somewhat heated instead of steam, because the required transformation and agitation can be obtained at a lower temperature than that of steam, hence the materials are not scorched or coagulated.

The strainer of wire-cloth or similar material, set into a frame like a damper, may be used to support moist grain while being dried. It allows water to run off, and it is turned up edgewise when the contents of the vessel are to be discharged.

The tubes B may be supported in any convenient manner—such, for instance, as by legs at the lower ends, as indicated by dotted lines in Fig. 1.

This apparatus is adapted to the agitation of petroleum or other oils while being chemically treated in refining them. The paddles and mechanical devices heretofore employed for agitating are thus dispensed with, and the air carries away the traces of light oils, and the fire-test is raised to a higher degree.

This apparatus may be used for concentrating sirups, as warm air passed through the sirup will carry away with it the watery portions at a temperature much below the boiling-point, and thus dispense with vacuum-pans.

Coffee and other berries or grains can be washed in this apparatus and then dried by the action of warm air. In this case it is preferable to use the apparatus A', which is open at top, and I remark that malt can be dried in this apparatus without the risk of injury.

If desired, the pipe B may be placed outside of the vessel A, and its ends be connected by curved elbows with such vessel A, the operation in that case being similar to that before described.

If a nozzle is applied at the steam-cock adjacent to the air-inlet, as indicated by dotted lines, the issuing jet of steam will draw in air, and the two will commingle and pass into the digesting-vessel.

I claim as my invention—

1. The combination, with the vessel A and open circulating-tube B, of the jet-pipe C and air and steam cocks and pipes $c$ and $d$, substantially as set forth.

2. In the digesting apparatus, the combination, with the vessel A, pipe B, and jet-pipe C, of the deflector D, having teeth, substantially as specified.

3. The combination, with a steam-digesting apparatus, of an air-supplying pipe and jet-tube and the open-ended circulating-tube B, whereby the contents of the digester are exposed to the action of air and caused to circulate for cooling and evaporating, substantially as set forth.

4. The combination, with the jet-pipe C, vessel A, open tube B, deflector D, and escape-pipe $g$, of the revolving fan E, as and for the purposes set forth.

5. The combination, with the jet-pipe C, vessel A, open tube B, and deflector D, of the supply pipe and cock $h$, pressure-gage $k$, safety-valve $m$, and pipe $l$, as set forth.

6. The combination, with the closed digesting-vessel A, and its steam and air supply pipes and cocks, of the open digesting-vessel A', having jet-tube C', circulating-tube B', and deflector D', and a pipe, $l$, passing from the top of the vessel A to the jet-tube C', whereby the steam or air escaping under pressure from the closed vessel A is utilized, as set forth.

Signed by me this 16th day of February, A. D. 1881.

EDWARD FOX.

Witnesses:
  Geo. T. Pinckney,
  Harold Serrell.